(12) United States Patent
Ohashi et al.

(10) Patent No.: US 10,193,405 B2
(45) Date of Patent: Jan. 29, 2019

(54) ROTARY ELECTRIC MACHINE AND MANUFACTURING METHOD THEREOF

(71) Applicant: Mitsubishi Electric Corporation, Tokyo (JP)

(72) Inventors: Naoki Ohashi, Tokyo (JP); Ryuichi Kitora, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 213 days.

(21) Appl. No.: 15/190,280

(22) Filed: Jun. 23, 2016

(65) Prior Publication Data
US 2017/0250585 A1 Aug. 31, 2017

(30) Foreign Application Priority Data
Feb. 25, 2016 (JP) ................. 2016-033830

(51) Int. Cl.
*H02K 3/28* (2006.01)
*H02K 15/00* (2006.01)
*H02K 3/52* (2006.01)

(52) U.S. Cl.
CPC ............... *H02K 3/28* (2013.01); *H02K 3/522* (2013.01); *H02K 15/0062* (2013.01); *H02K 15/0068* (2013.01); *H02K 2203/09* (2013.01)

(58) Field of Classification Search
CPC .. H02K 3/04; H02K 3/18; H02K 3/28; H02K 3/46; H02K 3/50; H02K 3/52;
(Continued)

(56) References Cited

U.S. PATENT DOCUMENTS

| 6,930,418 B2 * | 8/2005 | Kobayashi | H02K 3/522 310/214 |
| 7,193,345 B2 * | 3/2007 | Shinzaki | H02K 3/522 310/179 |

(Continued)

FOREIGN PATENT DOCUMENTS

| CN | 102088219 A | 6/2011 |
| JP | 2005312221 A | 11/2005 |

(Continued)

OTHER PUBLICATIONS

Communication dated Dec. 20, 2016, from the Japanese Patent Office in counterpart application No. 2016-033830.
(Continued)

*Primary Examiner* — Tran Nguyen
(74) *Attorney, Agent, or Firm* — Sughrue Mion, PLLC; Richard C. Turner

(57) ABSTRACT

In the rotary electric machine, bus-bar lead terminals of bus bars, which are held by a connection component, are formed in such a way that the bus-bar lead terminals are protruded from the bus bars to an axis direction of a stator, and a plurality of bus-bar storage grooves are formed by using a plurality of partitions which are concentrically arranged in a diameter direction of the stator via gaps, and in the plurality of partitions, lengths, in the axis direction, of the most outer circumference partition, which is positioned at the most outer circumference side in the diameter direction, and the most inner circumference partition, which is positioned at the most inner circumference side in the diameter direction, are longer than lengths, in the axis direction, of a plurality of middle partitions, which are positioned between the most outer circumference partition and the most inner circumference partition.

12 Claims, 8 Drawing Sheets

(58) Field of Classification Search
CPC .... H02K 3/522; H02K 15/00; H02K 15/0062; H02K 15/0068; H02K 15/04
See application file for complete search history.

(56) References Cited

U.S. PATENT DOCUMENTS

| | | | |
|---|---|---|---|
| 7,626,294 B2* | 12/2009 | Ohta | H02K 1/148 310/194 |
| 2004/0251752 A1* | 12/2004 | Shinzaki | H02K 3/522 310/71 |
| 2009/0039720 A1* | 2/2009 | Tsukashima | H02K 3/522 310/71 |
| 2011/0133581 A1 | 6/2011 | Ha | |
| 2013/0069461 A1* | 3/2013 | Arai | H02K 3/522 310/71 |

FOREIGN PATENT DOCUMENTS

| | | | |
|---|---|---|---|
| JP | 2010141953 A | 6/2010 | |
| JP | 2011-120441 A | 6/2011 | |
| JP | 5652004 B2 | 1/2015 | |
| JP | 2015171245 A | 9/2015 | |

OTHER PUBLICATIONS

Communication dated Sep. 27, 2018 in State Intellectual Property Office of the P.R.C. in counterpart application No. 201610973184.9.

* cited by examiner

ROTARY ELECTRIC MACHINE AND MANUFACTURING METHOD THEREOF

BACKGROUND OF THE INVENTION

Technical Field

The present invention relates to a rotary electric machine, and particularly relates to a rotary electric machine which includes a connection component, for distributing an electric power to a stator coil, at an end portion in an axis direction of a stator, and a manufacturing method of the rotary electric machine.

Background Art

As known in a conventional art, in a rotary electric machine which includes a plurality of stator coils, which are intensively wound, at an inner circumference surface of a stator core, connection components, which respectively connect each of the stator coils and distribute an electric power to the stator coils, are provided at one end portion or both end portions in an axis direction of a stator which is composed of the stator core and the stator coils. The connection components include a holder having an annular shape, which is made of, for example, an insulating material such as a resin, and a plurality of bus bars which are installed in a concave groove provided at the holder.

In a conventional rotary electric machine, the above-described connection components are manufactured, for example, as described in Patent Document 1, in such a way that a resin and bus bars are integrally inserted and molded by using a resin molding die, or the connection components are manufactured, as described in Patent Document 2, in such a way that bus bars are inserted to a bus-bar storage groove of a holder made of a resin, which is previously formed, and after that, the holder made of a resin and the bus bars are integrally fixed by using an adhesive resin.

CONVENTIONAL ART DOCUMENT

Patent Document

Patent Document 1:
  Japanese Patent Publication No. 5652004
Patent Document 2:
  Japanese Laid-Open Patent Publication No. 2011-120441

SUMMARY OF THE INVENTION

Problems to be Solved by the Invention

When the connection components are manufactured by an inserting and molding process which is disclosed in Patent Document 1, although the resin and the bus bars are inserted and molded by sealing and clamping a terminal portion which is protruded from the bus bars, a limitation for a layout, in which space for sealing the terminal portion is required, is caused. Moreover, when the inserting and molding process is performed, after the bus bars are set in the die, the resin are poured in the die, whereby the resin and the bus bars are integrally inserted and molded, so that there have been problems in that a long time is required for manufacturing the connection components, and a configuration of the die is complex, and a technical difficulty level for manufacturing the connection components is increased, and a manufacturing cost is increased.

On the other hand, when the connection components are configured in such a way that the bus bars and the holder made of a resin are integrally fixed by using an adhesive resin after the bus bars are inserted to the bus-bar storage grooves of the holder made of the resin, which are previously formed, it is required that the adhesive resin is coated while a nozzle for coating the adhesive resin is avoided from an interference object and is shifted, so that there have been problems in that a coating time of the adhesive resin is increased, and a manufacturing cost is increased.

The present invention has been made to solve the above-described problems, and an object of the invention is to provide a rotary electric machine, which can be easily manufactured at a cheap manufacturing cost, and a manufacturing method of the rotary electric machine.

Means for Solving Problems

A rotary electric machine of the present invention includes a stator which includes stator coils for a plurality of phases at an inner circumference portion of a stator core which is formed in an annular shape; a rotor which is inserted to central space of the stator, and includes a plurality of magnetic poles at an outer circumference portion; and a connection component which is mounted at least at one end portion in an axis direction of the stator, and mutually connects the stator coils for the plurality of phases, and holds bus bars which feed an electric current to the stator coils for the plurality of phases; wherein the connection component includes a holder made of an insulating material, which is formed in an annular shape, and is mounted at the stator in a state where one end portion in an axis direction of the connection component is faced to the one end portion in the axis direction of the stator, and includes a plurality of bus-bar storage grooves having an annular shape, which are concentrically arranged at the other end portion in the axis direction of the connection component, a plurality of bus bars having an annular shape, which are respectively installed in the plurality of bus-bar storage grooves, and are respectively corresponded to the plurality of phases, and an adhesive resin which is arranged in each of the bus-bar storage grooves, and fixes the plurality of bus bars to the holder; and the plurality of bus bars include bus-bar lead terminals which are respectively connected to coil lead terminals of the stator coils for the plurality of phases, which are corresponded to the bus bars; and the bus-bar lead terminals are formed in such a way that the bus-bar lead terminals are protruded from the bus bars to the axis direction of the stator; and the plurality of bus-bar storage grooves are formed by using a plurality of partitions which are concentrically arranged in a diameter direction of the stator via gaps; and in the plurality of partitions, lengths, in the axis direction, of the most outer circumference partition, which is positioned at the most outer circumference side in the diameter direction, and the most inner circumference partition, which is positioned at the most inner circumference side in the diameter direction, are longer than lengths, in the axis direction, of a plurality of middle partitions, which are positioned between the most outer circumference partition and the most inner circumference partition; and the lengths, in the axis direction, of the plurality of middle partitions are practically identical.

Moreover, a rotary electric machine of the present invention includes a stator which includes stator coils for a plurality of phases at an inner circumference portion of a stator core which is formed in an annular shape; a rotor which is inserted to central space of the stator, and includes a plurality of magnetic poles at an outer circumference portion; and a connection component which is mounted at least at one end portion in an axis direction of the stator, and mutually connects the stator coils for the plurality of phases, and holds bus bars which feed an electric current to the stator coils for the plurality of phases; wherein the connection component includes a holder made of an insulating material, which is formed in an annular shape, and is mounted at the stator in a state where one end portion in an axis direction of the connection component is faced to the one end portion in the axis direction of the stator, and includes a plurality of bus-bar storage grooves having an annular shape, which are concentrically arranged at the other end portion in the axis direction of the connection component, a plurality of bus bars having an annular shape, which are respectively installed in the plurality of bus-bar storage grooves, and are respectively corresponded to the plurality of phases, and an adhesive resin which is arranged in each of the bus-bar storage grooves, and fixes the plurality of bus bars to the holder; and the plurality of bus bars include bus-bar lead terminals which are respectively connected to coil lead terminals of the stator coils for the plurality of phases, which are corresponded to the bus bars; and the bus-bar lead terminals are formed in such a way that the bus-bar lead terminals are protruded from the bus bars to the axis direction of the stator; and the plurality of bus-bar storage grooves are formed by using a plurality of partitions which are concentrically arranged in a diameter direction of the stator via gaps; and in the plurality of partitions, lengths, in the axis direction, of the most outer circumference partition, which is positioned at the most outer circumference side in the diameter direction, and the most inner circumference partition, which is positioned at the most inner circumference side in the diameter direction, are longer than lengths, in the axis direction, of a plurality of middle partitions, which are positioned between the most outer circumference partition and the most inner circumference partition; and the plurality of middle partitions are configured in such a way that a plurality of middle partitions, of which lengths in the axis direction are different from each other, are mixed.

In a rotary electric machine of the present invention, it is preferable that a middle partition, which is practically positioned at a central position in the diameter direction, in the plurality of middle partitions, is formed in such a way that a length, in the axis direction, of the middle partition is longer than lengths, in the axis direction, of the other middle partitions.

Moreover, in a rotary electric machine of the present invention, it is preferable that the bus-bar lead terminals include first extended portions which are configured in such a way that those are led from the bus bars to the axis direction of the stator, and a thickness direction is practically identical to a diameter direction of the stator, and a width direction is practically identical to a circumference direction of the stator; and second extended portions which are bent from end portions of the first extended portions in the axis direction of the stator to an edgewise direction of the first extended portions, and are extended in the circumference direction of the stator.

Moreover, in a rotary electric machine of the present invention, it is preferable that the bus bars include protrusions which are formed in such a way that the protrusions are protruded from the bus bars to the axis direction of the stator.

A manufacturing method of a rotary electric machine of the present invention, which includes a stator which includes stator coils for a plurality of phases at an inner circumference portion of a stator core which is formed in an annular shape; a rotor which is inserted to central space of the stator, and includes a plurality of magnetic poles at an outer circumference portion; and a connection component which is mounted at least at one end portion in an axis direction of the stator, and mutually connects the stator coils for the plurality of phases, and holds bus bars which feed an electric current to the stator coils for the plurality of phases; in which the connection component includes a holder made of an insulating material, which is formed in an annular shape, and is mounted at the stator in a state where one end portion in an axis direction of the connection component is faced to the one end portion in the axis direction of the stator, and includes a plurality of bus-bar storage grooves having an annular shape, which are concentrically arranged at the other end portion in the axis direction of the connection component, a plurality of bus bars having an annular shape, which are respectively installed in the plurality of bus-bar storage grooves, and are respectively corresponded to the plurality of phases, and an adhesive resin which is arranged in each of the bus-bar storage grooves, and fixes the plurality of bus bars to the holder; and the plurality of bus bars include bus-bar lead terminals which are respectively connected to coil lead terminals of the stator coils for the plurality of phases, which are corresponded to the bus bars; and the bus-bar lead terminals are formed in such a way that the bus-bar lead terminals are protruded from the bus bars to the axis direction of the stator; wherein the manufacturing method includes a first step in which the adhesive resin is previously coated on the plurality of bus-bar storage grooves before the plurality of bus bars are installed to the plurality of bus-bar storage grooves; a second step in which end portions in the axis direction of the bus-bar lead terminals are practically pressed in the axis direction, and the plurality of bus bars are inserted to the plurality of bus-bar storage grooves on which the adhesive resin is coated; a third step in which the holder is mounted at the stator in such a way that one end portion in the axis direction of the holder is faced to one end portion in the axis direction of the stator; and a fourth step in which the bus-bar lead terminals are connected to the coil lead terminals.

Moreover, in a manufacturing method of a rotary electric machine of the present invention, it is preferable that the bus-bar lead terminals include first extended portions which are configured in such a way that those are led from the bus bars to the axis direction of the stator, and a thickness direction is practically identical to a diameter direction of the stator, and a width direction is practically identical to a circumference direction of the stator; and second extended portions which are bent from end portions of the first extended portions in the axis direction of the stator to an edgewise direction of the first extended portions, and are extended in the circumference direction of the stator; and the second step is composed of a step in which end portions of the second extended portions in the axis direction are practically pressed in the axis direction, and the plurality of bus bars are inserted to the plurality of bus-bar storage grooves on which the adhesive resin is coated.

Moreover, a manufacturing method of a rotary electric machine of the present invention, which includes a stator which includes stator coils for a plurality of phases at an inner circumference portion of a stator core which is formed in an annular shape; a rotor which is inserted to central space of the stator, and includes a plurality of magnetic poles at an outer circumference portion; and a connection component which is mounted at least at one end portion in an axis direction of the stator, and mutually connects the stator coils for the plurality of phases, and holds bus bars which feed an electric current to the stator coils for the plurality of phases; in which the connection component includes a holder made of an insulating material, which is formed in an annular shape, and is mounted at the stator in a state where one end portion in an axis direction of the connection component is faced to the one end portion in the axis direction of the stator, and includes a plurality of bus-bar storage grooves having an annular shape, which are concentrically arranged at the other end portion in the axis direction of the connection component, a plurality of bus bars having an annular shape, which are respectively installed in the plurality of bus-bar storage grooves, and are respectively corresponded to the plurality of phases, and an adhesive resin which is arranged in each of the bus-bar storage grooves, and fixes the plurality of bus bars to the holder; and the plurality of bus bars include bus-bar lead terminals which are respectively connected to coil lead terminals of the stator coils for the plurality of phases, which are corresponded to the bus bars; and protrusions which are formed in such a way that the protrusions are protruded from the bus bars to the axis direction of the stator; wherein the manufacturing method includes a first step in which the adhesive resin is previously coated on the plurality of bus-bar storage grooves before the plurality of bus bars are installed to the plurality of bus-bar storage grooves; a second step in which end portions in the axis direction of the bus-bar lead terminals are practically pressed in the axis direction, and the plurality of bus bars are inserted to the plurality of bus-bar storage grooves on which the adhesive resin is coated; a third step in which the holder is mounted at the stator in such a way that one end portion in the axis direction of the holder is faced to one end portion in the axis direction of the stator; and a fourth step in which the bus-bar lead terminals are connected to the coil lead terminals.

Moreover, in a manufacturing method of a rotary electric machine of the present invention, it is preferable that the plurality of bus-bar storage grooves are formed by using a plurality of partitions which are concentrically arranged in a diameter direction of the stator via gaps; and in the plurality of partitions, lengths, in the axis direction, of the most outer circumference partition, which is positioned at the most outer circumference side in the diameter, and the most inner circumference partition, which is positioned at the most inner circumference side in the diameter direction, are longer than lengths, in the axis direction, of a plurality of middle partitions, which are positioned between the most outer circumference partition and the most inner circumference partition; and the first step is composed of a step in which the adhesive resin is previously coated on the plurality of bus-bar storage grooves before the plurality of bus bars are installed to the plurality of bus-bar storage grooves.

Moreover, in a manufacturing method of a rotary electric machine of the present invention, it is preferable that the plurality of bus-bar storage grooves are formed by using a plurality of partitions which are concentrically arranged in a diameter direction of the stator via gaps; and in the plurality of partitions, lengths, in the axis direction, of the most outer circumference partition, which is positioned at the most outer circumference side in the diameter direction, and the most inner circumference partition, which is positioned at the most inner circumference side in the diameter direction, are longer than lengths, in the axis direction, of a plurality of middle partitions, which are positioned between the most outer circumference partition and the most inner circumference partition; and a middle partition, which is practically positioned at a central position in the diameter direction, in the plurality of middle partitions, is formed in such a way that a length, in the axis direction, of the middle partition is longer than lengths, in the axis direction, of the other middle partitions; and a first step is composed of a step in which the adhesive resin is previously coated on the plurality of bus-bar storage grooves in such a way that the middle partition, of which length in the axis direction is longer than the lengths, in the axis direction, of the other middle partitions, is used as a guide, before the plurality of bus bars are installed to the plurality of bus-bar storage grooves.

Effects of the Invention

According to the rotary electric machine of the present invention, the bus-bar lead terminals are formed in such a way that the bus-bar lead terminals are protruded from the bus bars to the axis direction of the stator; and the plurality of bus-bar storage grooves are formed by using a plurality of partitions which are concentrically arranged in a diameter direction of the stator via gaps; and in the plurality of partitions, lengths, in the axis direction, of the most outer circumference partition, which is positioned at the most outer circumference side in the diameter direction, and the most inner circumference partition, which is positioned at the most inner circumference side in the diameter direction, are longer than lengths, in the axis direction, of a plurality of middle partitions, which are positioned between the most outer circumference partition and the most inner circumference partition; and the lengths, in the axis direction, of the plurality of middle partitions are practically identical, so that a relatively much adhesive resin is poured between the most outer circumference partition and the most inner circumference partition, for example, by using a relatively thick nozzle, whereby the adhesive resin is concurrently coated on the plurality of bus-bar storage grooves. Moreover, the bus-bar lead terminals, which are formed in such a way that the bus-bar lead terminals are protruded from the bus bars to the axis direction of the stator, are pressed, whereby the bus bars can be certainly inserted to the bus-bar storage grooves on which the adhesive resin is coated. Therefore, the rotary electric machine, which can be easily manufactured at a cheap manufacturing cost, can be obtained.

Moreover, according to the rotary electric machine of the present invention, the bus-bar lead terminals are formed in such a way that the bus-bar lead terminals are protruded from the bus bars to the axis direction of the stator; and the plurality of bus-bar storage grooves are formed by using a plurality of partitions which are concentrically arranged in a diameter direction of the stator via gaps; and in the plurality of partitions, lengths, in the axis direction, of the most outer circumference partition, which is positioned at the most outer circumference side in the diameter direction, and the most inner circumference partition, which is positioned at the most inner circumference side in the diameter direction, are longer than lengths, in the axis direction, of a plurality of middle partitions, which are positioned between the most outer circumference partition and the most inner circumference partition; and the plurality of middle partitions are configured in such a way that a plurality of middle partitions, of which lengths in the axis direction are different from each other, are mixed, so that the adhesive resin is poured in the bus-bar storage grooves in such a way that, for example, the middle partition, of which length in the axis direction is longer than the lengths, in the axis direction, of the other middle partitions, is used as a guide, and the end portions in the axis direction of the other middle partitions are buried, whereby the adhesive resin can be coated on the bus-bar storage grooves. Moreover, the bus-bar lead terminals, which are formed in such a way that the bus-bar lead terminals are protruded from the bus bars to an axis direction of the stator, are pressed, whereby the bus bars can be certainly inserted to the bus-bar storage grooves on which the adhesive resin is coated. Therefore, the rotary electric machine, which can be easily manufactured at a cheap manufacturing cost, can be obtained.

Moreover, according to the manufacturing method of the rotary electric machine of the present invention, the manufacturing method includes a first step in which the adhesive resin is previously coated on the plurality of bus-bar storage grooves before the plurality of bus bars are installed to the plurality of bus-bar storage grooves; a second step in which end portions in the axis direction of the bus-bar lead terminals are practically pressed in the axis direction, and the plurality of bus bars are inserted to the plurality of bus-bar storage grooves on which the adhesive resin is coated; a third step in which the holder is mounted at the stator in such a way that one end portion in the axis direction of the holder is faced to one end portion in the axis direction of the stator; and a fourth step in which the bus-bar lead terminals are connected to the coil lead terminals, so that the adhesive resin can be coated on the bus-bar storage grooves of the holder at a stage in which the bus bars is not inserted, and the adhesive resin can be very easily coated. Moreover, the end portions of the bus-bar lead terminals in the axis direction are practically pressed in the axis direction, and the plurality of bus bars are inserted to the plurality of bus-bar storage grooves on which the adhesive resin is coated, whereby an adhesive is not adhered to a tool by which the bus bars are pressed and inserted to the bus-bar storage grooves, and it can be prevented that the adhesive resin is adhered to the other work and a weld failure or the like is caused when the coil lead terminals are connected to the bus-bar lead terminals by a weld process or the like. Moreover, when the bus bars are pressed and inserted to the bus-bar storage grooves, the bus bars can be pressed by a necessary and sufficient force, and it can be prevented that the bus bars are floated from the holder, and the bus bars are non-uniformly inserted, and sizes of the weld portions, at which the coil lead terminals are welded to the bus-bar lead terminals, are not uniform.

Moreover, according to the manufacturing method of the rotary electric machine of the present invention, the manufacturing method includes a first step in which the adhesive resin is previously coated on the plurality of bus-bar storage grooves before the plurality of bus bars are installed to the plurality of bus-bar storage grooves; a second step in which end portions in the axis direction of the protrusions of the bus bars are practically pressed in the axis direction, and the plurality of bus bars are inserted to the plurality of bus-bar storage grooves on which the adhesive resin is coated; a third step in which the holder is mounted at the stator in such a way that one end portion in the axis direction of the holder is faced to one end portion in the axis direction of the stator; and a fourth step in which the bus-bar lead terminals are connected to the coil lead terminals, so that the end portions of the bus-bar lead terminals in the axis direction are practically pressed in the axis direction, and the plurality of bus bars are inserted to the plurality of bus-bar storage grooves on which the adhesive resin is coated, whereby an adhesive is not adhered to a tool by which the bus bars are pressed and inserted to the bus-bar storage grooves, and it can be prevented that the adhesive resin is adhered to the other work and a weld failure or the like is caused when the coil lead terminals are connected to the bus-bar lead terminals by a weld process or the like. Moreover, when the bus bars are pressed and inserted to the bus-bar storage grooves, the bus bars can be pressed by a more sufficient force, and it can be prevented that the bus bars are floated from the holder, and the bus bars are non-uniformly inserted, and sizes of the weld portions, at which the coil lead terminals are welded to the bus-bar lead terminals, are not uniform.

DETAILED DESCRIPTION OF THE PREFERRED EMBODIMENTS

Embodiment 1

Figure 1:
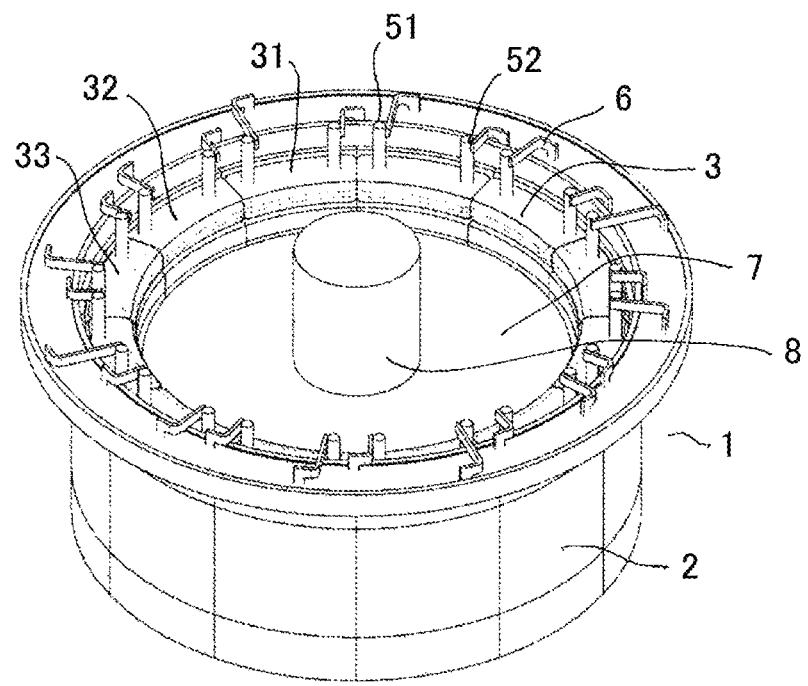
FIG. 1 is a schematic oblique perspective view illustrating a rotary electric machine according to Embodiment 1 of the present invention.
Figure 2:
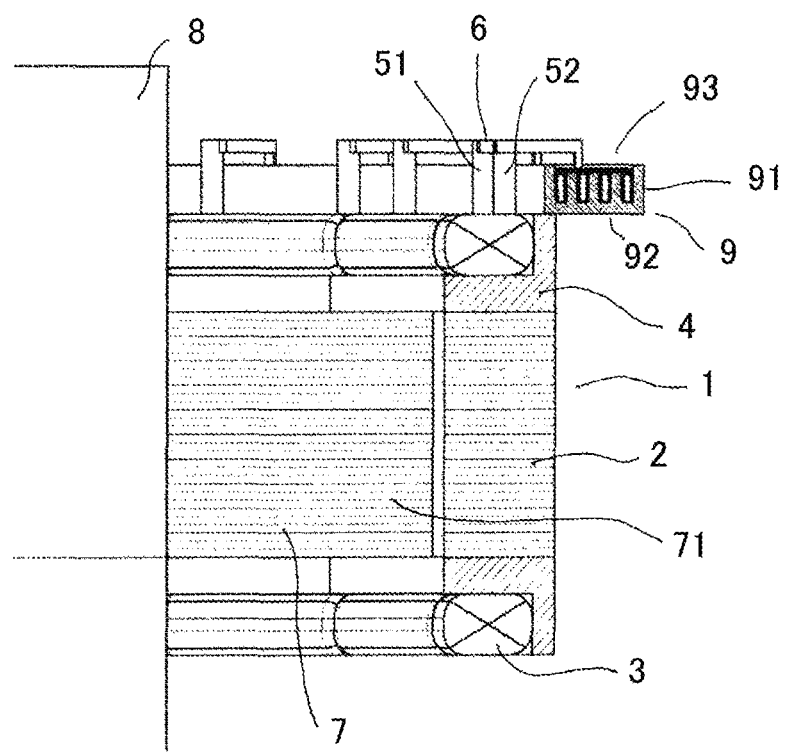
FIG. 2 is a schematic cross-sectional view illustrating the rotary electric machine according to Embodiment 1 of the present invention.
Figure 3:
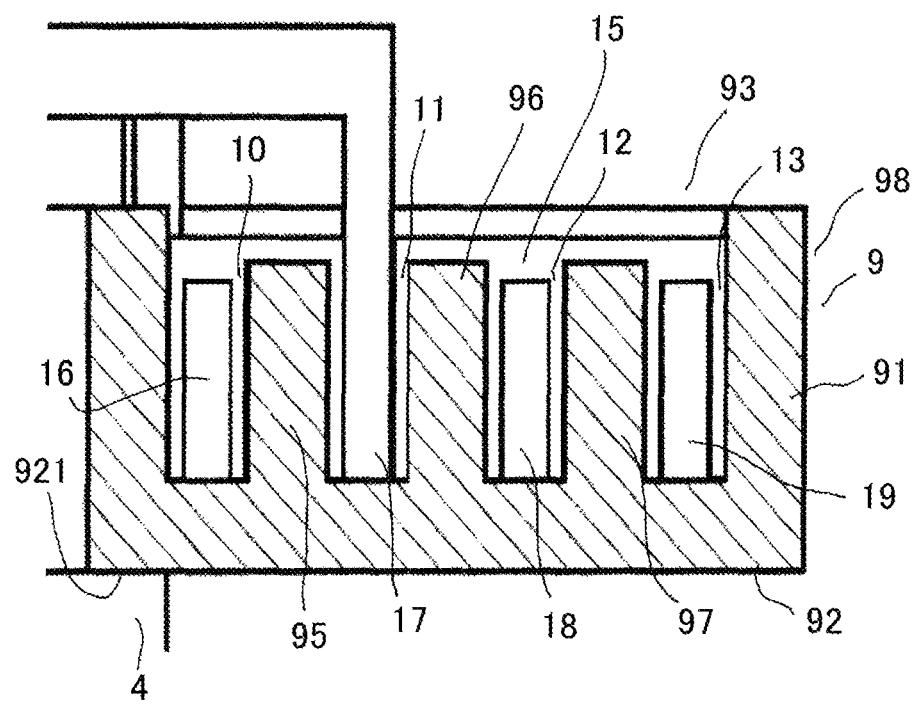
FIG. 3 is a cross-sectional view enlarging and illustrating a part of the rotary electric machine according to Embodiment 1 of the present invention.
Figure 4:
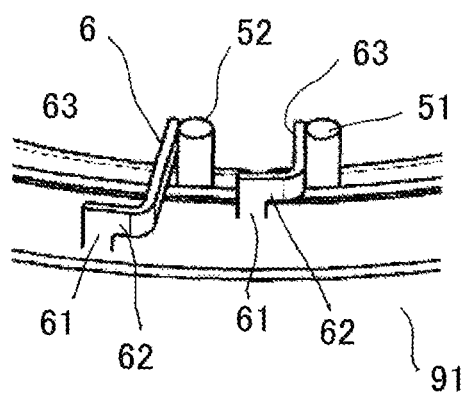
FIG. 4 is an oblique perspective view enlarging and illustrating a part of the rotary electric machine according to Embodiment 1 of the present invention.

Hereinafter, a rotary electric machine and a manufacturing method of the rotary electric machine according to Embodiment 1 of the present invention will be explained in reference to the drawings. The rotary electric machine according to Embodiment 1 is configured, for example, as an inner-rotor-type three-phase brushless motor, and the rotary electric machine is used for a driving source of a vehicle such as a car. FIG. 1 is a schematic oblique perspective view illustrating the rotary electric machine according to Embodiment 1 of the present invention, and FIG. 2 is a schematic cross-sectional view illustrating the rotary electric machine according to Embodiment 1 of the present invention, and FIG. 3 is a cross-sectional view enlarging and illustrating a part of the rotary electric machine according to Embodiment 1 of the present invention, and FIG. 4 is an oblique perspective view enlarging and illustrating a part of the rotary electric machine according to Embodiment 1 of the present invention. In FIG. 1 through FIG. 4, a stator 1, which is formed in a hollow annular shape, is configured in such a way that 3×n (integer) of pieces of separated cores 2 are connected in a circumferential direction of the stator 1. Each of the separated cores 2 is configured in such a way that lamination steel sheets are laminated in an axis direction of the stator 1. A plurality of stator coils 3, which are intensively wound around the plurality of separated cores 2 via an insulating component 4, are provided at an inner circumference portion of the stator 1.

The plurality of stator coils 3 are composed of a plurality of U-phase coils 31 to which a U-phase current is supplied, a plurality of V-phase coils 32 to which a V-phase current is supplied, and a plurality of W-phase coils 33 to which a W-phase current is supplied. Each of the plurality of stator coils 3, which are intensively wound, includes first coil lead terminals 51 which are winding-start portions of the stator coils 3, and second coil lead terminals 52 which are winding-end portions of the stator coils 3. Each of the first coil lead terminals 51 and the second coil lead terminals 52 are configured in such a way that the terminals are protruded from one end surface in an axis direction of the stator 1 to the axis direction of the stator 1, and are welded and connected to bus-bar lead terminals 6 which are provided at bus bars (described later).

A rotor 7 is configured in such a way that lamination steel sheets are laminated in a shaft direction, and includes a rotor core 71, in which a central portion is penetrated by a rotor shaft 8 so as to be fixed to the rotor shaft 8, and a plurality of rotor magnetic poles (not illustrated), which are fixed to an outer circumference surface of the rotor core 71. The rotor magnetic poles are composed of permanent magnets which are magnetized in a predetermined direction. The rotor 7 is inserted to inside space of the stator 1 having an annular shape, in such a way that an outer circumference surface of each of the rotor magnetic poles is faced to an inner circumference surface of the stator 1 via a predetermined gap. The rotor 7 is rotatably held by a pair of bearings (not illustrated) via the rotor shaft 8.

A connection component 9 is mounted at one end portion in an axis direction of the stator 1. The connection component 9 includes a holder 91 having an annular shape, which is made of an insulating material such as a resin. In the holder 91 made of an insulating material, an inner circumference side end surface 921 of one end portion 92 in an axis direction of the holder 91 is contacted to one end portion in an axis direction of the insulating component 4 which is provided in the stator 1. As well illustrated in FIG. 3, a first bus-bar storage groove 10, a second bus-bar storage groove 11, a third bus-bar storage groove 12, and a forth bus-bar storage groove 13, which are formed in a diameter direction of the holder 91 via a predetermined gap, are formed at the other end portion 93 in the axis direction of the holder 91.

The first bus-bar storage groove 10 is positioned between the most inner circumference partition 94, which is provided at the most inner circumference side of the holder 91, and a first middle partition 95, which is adjacent to an outer diameter side of the most inner circumference partition 94. The second bus-bar storage groove 11 is positioned between the first middle partition 95, which is provided in the holder 91, and a second middle partition 96, which is adjacent to an outer diameter side of the first middle partition 95. The third bus-bar storage groove 12 is positioned between the second middle partition 96, which is provided in the holder 91, and a third middle partition 97, which is adjacent to an outer diameter side of the second middle partition 96. The fourth bus-bar storage groove 13 is positioned between the third middle partition 97, which is provided in the holder 91, and the most outer circumference partition 98, which is adjacent to an outer diameter side of the third middle partition 97.

Lengths, in the axis direction of the stator 1, of the most outer circumference partition 98, which is positioned at the most outer circumference side in a diameter direction of the stator 1, and the most inner circumference partition 94, which is positioned at the most inner circumference side in the diameter direction of the stator 1, are longer than lengths, in an axis direction, of the first middle partition 95, the second middle partition 96, and the third middle partition 97, which are a plurality of middle partitions positioned between the most outer circumference partition 98 and the most inner circumference partition 94, and moreover, the lengths, in the axis direction, of the first middle partition 95, the second middle partition 96, and the third middle partition 97 are practically identical.

A first bus bar 16, which is formed in an annular shape, for example, as a neutral bus bar, is installed in the first bus-bar storage groove 10. A second bus bar 17, which is formed in an annular shape, for example, as a U-phase bus bar, is installed in the second bus-bar storage groove 11. A third bus bar 18, which is formed in an annular shape, for example, as a V-phase bus bar, is installed in the third bus-bar storage groove 12. A fourth bus bar 19, which is formed in an annular shape, for example, as a W-phase bus bar, is installed in the fourth bus-bar storage groove 13.

An adhesive resin 15 is coated on the first bus-bar storage groove 10, the second bus-bar storage groove 11, the third bus-bar storage groove 12, and the fourth bus-bar storage groove 13, and moreover, the first bus bar 16, the second bus bar 17, the third bus bar 18, and the fourth bus bar 19 are fixed to the holder 91 by the adhesive resin 15.

A plurality of bus-bar lead terminals 6, which are extended from each of one end portions in an axis direction to the axis direction, are provided at the first bus bar 16, the second bus bar 17, the third bus bar 18, and the fourth bus bar 19. The bus-bar lead terminals 6 are electrically and mechanically connected to the first bus bar 16, the second bus bar 17, the third bus bar 18, and the fourth bus bar 19, which are respectively corresponding to the bus-bar lead terminals 6, and welded and connected to the first coil lead terminals 51 and the second coil lead terminals 52 of the stator coils 3, which are respectively corresponding to the bus-bar lead terminals 6.

The bus-bar lead terminals 6, which are well illustrated in FIG. 1 through FIG. 4, include first extended portions 61 which are configured in such a way that those are led from the first bus bar 16, the second bus bar 17, the third bus bar 18, and the fourth bus bar 19 to the axis direction of the stator 1, and a thickness direction is practically identical to a diameter direction of the stator 1, and a width direction is practically identical to a circumference direction of the stator 1; second extended portions 62 which are bent from end portions of the first extended portions 61 in the axis direction of the stator 1 to an edgewise direction of the first extended portions 61, and are extended in the circumference direction of the stator 1; and third extended portions 63 which are bent from the second extended portions 62 to the diameter direction of the stator 1. Each of the third extended portions 63 of the plurality of bus-bar lead terminals 6 is welded and connected to the first coil lead terminals 51 or the second coil lead terminals 52, which are corresponding to the third extended portions 63, of the stator coils 3. Weld portions of the bus-bar lead terminals 6 are composed of the third extended portions 63, which are extended from the second extended portions 62 to the circumference direction of the stator 1, in a state where an extension size of the third extended portions 63 is longer than a sum of a width of the first extended portions 61 (a length in the circumference direction of the stator 1), which is a bus-bar weld portion rising width, and a length of a bend radius which is bent to an edgewise direction.

Figure 5:
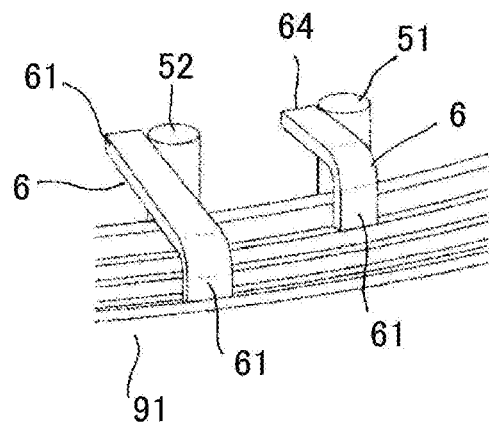
FIG. 5 is an oblique perspective view enlarging and illustrating a deformation example of a part of the rotary electric machine according to Embodiment 1 of the present invention.

FIG. 5 is an oblique perspective view enlarging and illustrating a deformation example of a part of the rotary electric machine according to Embodiment 1 of the present invention. As illustrated in FIG. 5, the bus-bar lead terminals 6 may include the first extended portions 61, which are configured in such a way that those are led from the first bus bar 16, the second bus bar 17, the third bus bar 18, and the fourth bus bar 19 to the axis direction of the stator 1, and a thickness direction is practically identical to a diameter direction of the stator 1, and a width direction is practically identical to a circumference direction of the stator 1; and fourth extended portions 64 which is bent from the first extended portions 61 to the diameter direction of the stator 1. In a case of the deformation example, the bus-bar lead terminals 6 don't include the second extended portions 62 which are bent from end portions of the first extended portions 61 in the axis direction of the stator 1 to the edgewise direction of the first extended portions 61, and are extended in the circumference direction of the stator 1, and the third extended portions 63 which are bent from the second extended portions 62 to the diameter direction of the stator 1, which are illustrated in FIG. 4. Moreover, each of the fourth extended portions 64 of the plurality of bus-bar lead terminals 6 is welded and connected to the first coil lead terminals 51 or the second coil lead terminals 52, which are corresponding to the stator coils 3.

For example, when the stator coils 3 are formed in a three-phase Y-connection, the first coil lead terminals 51 of a plurality of U-phase coils 31 are connected each other by the second bus bar 17, and the first coil lead terminals 51 of a plurality of V-phase coils 32 are connected each other by the third bus bar 18, and the first coil lead terminals 51 of a plurality of W-phase coils 33 are connected each other by the fourth bus bar 19. The second coil lead terminals 52 of the plurality of U-phase coils 31, the second coil lead terminals 52 of the plurality of V-phase coils 32, and the second coil lead terminals 52 of the plurality of W-phase coils 33 are connected each other by the first bus bar 16 so as to configure a neutral point of the three-phase Y-connection.

Moreover, the second bus bar 17 is connected to a U-phase output terminal (not illustrated) of an inverter, and the third bus bar 18 is connected to a V-phase output terminal (not illustrated) of the inverter, and the fourth bus bar 19 is connected to a W-phase output terminal (not illustrated) of the inverter, whereby a U-phase current, a V-phase current, and a W-phase current are respectively supplied from the inverter to the U-phase coils 31, the V-phase coils 32, and W-phase coils 33.

In addition, an operation for a motor and an operation for a generator in the rotary electric machine according to Embodiment 1 of the present invention, which is configured as described above, are similar to an operation of a well-known rotary electric machine in this family, so that an explanation is omitted.

Figure 6:
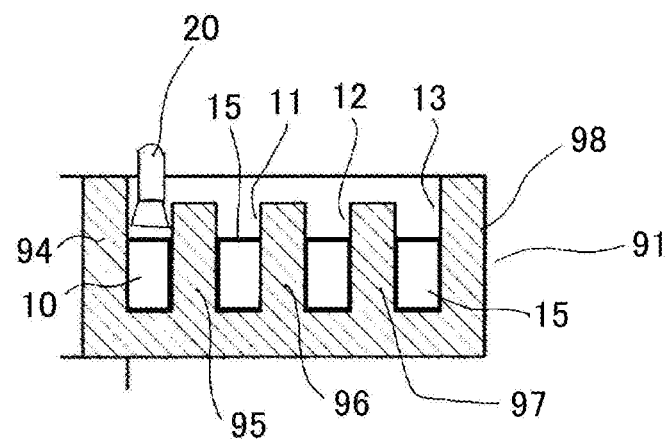
FIG. 6 is an explanatory view illustrating a manufacturing method of the rotary electric machine according to Embodiment 1 of the present invention.

Hereinafter, a manufacturing method of the rotary electric machine according to Embodiment 1 of the present invention will be explained. FIG. 6 is an explanatory view illustrating a manufacturing method of the rotary electric machine according to Embodiment 1 of the present invention, and FIG. 6 indicates a first step in which the thermo-setting liquid adhesive resin 15 is poured from a nozzle 20 so as to be coated on the first bus-bar storage groove 10, the second bus-bar storage groove 11, the third bus-bar storage groove 12, and the fourth bus-bar storage groove 13 of the holder 91 which is made of an insulating material such as a resin. In a case of the manufacturing method of the rotary electric machine according to Embodiment 1, as described above, lengths, in the axis direction, of the most outer circumference partition 98, which is positioned at the most outer circumference side in a diameter direction of the stator 1, and the most inner circumference partition 94, which is positioned at the most inner circumference side in the diameter direction of the stator 1, are longer than lengths, in the axis direction, of the first middle partition 95, the second middle partition 96, and the third middle partition 97, which are plurality of middle partitions positioned between the most outer circumference partition 98 and the most inner circumference partition 94, and moreover, the lengths, in the axis direction, of the first middle partition 95, the second middle partition 96, and the third middle partition 97 are practically identical, so that the nozzle 20 is sequentially shifted in a diameter direction, whereby the first step, in which the adhesive resin 15 is filled in the first bus-bar storage groove 10, the second bus-bar storage groove 11, the third bus-bar storage groove 12, and the fourth bus-bar storage groove 13, can be performed.

Figure 7:
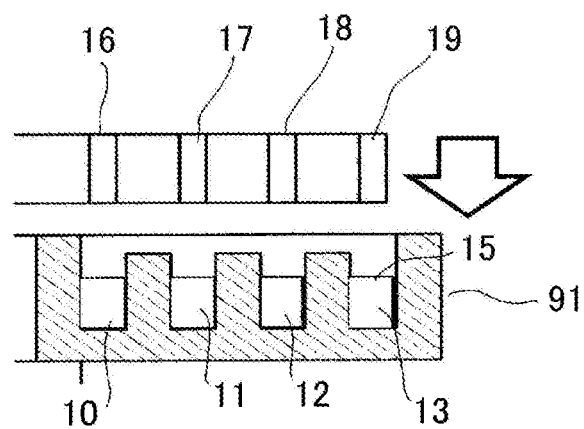
FIG. 7 is an explanatory view illustrating a manufacturing method of the rotary electric machine according to Embodiment 1 of the present invention.

FIG. 7 is an explanatory view illustrating a manufacturing method of the rotary electric machine according to Embodiment 1 of the present invention, and FIG. 7 indicates a second step in which the end portions of the bus-bar lead terminals 6 in an axis direction of the stator 1, which are illustrated in FIG. 1 through FIG. 4, are practically pressed in the axis direction of the stator 1, and the first bus bar 16, the second bus bar 17, the third bus bar 18, and the fourth bus bar 19 are inserted to the first bus-bar storage groove 10, the second bus-bar storage groove 11, the third bus-bar storage groove 12, and the fourth bus-bar storage groove 13, on which the adhesive resin 15 is coated. When the second step is terminated, the holder 91, the first bus bar 16, the second bus bar 17, the third bus bar 18, and the fourth bus bar 19 are combined as illustrated in FIG. 3. After that, the adhesive resin 15 is hardened at a high temperature, whereby the holder 91, the first bus bar 16, the second bus bar 17, the third bus bar 18, and the fourth bus bar 19 are integrated, and the connection component 9 is completed.

After that, a third step is performed, in which the holder 91 of the connection component 9 is mounted on the stator 1 in such a way that one end portion in an axis direction of the holder 91 is faced to one end portion in the axis direction of the stator 1. In addition, the third step may be performed before the first step is performed.

After that, a fourth step is performed, in which the bus-bar lead terminals 6 are connected to the first coil lead terminals 51 and the second coil lead terminals 52 by using a welding process or the like. Thereby, the rotary electric machine, which is illustrated in FIG. 1 and FIG. 2, is manufactured.

As described above, the adhesive resin 15 is previously coated in each of the bus-bar storage grooves of the holder 91, and the bus bars are inserted later, whereby it is not required that the nozzle is shifted while the nozzle is avoided from the bus bars and the weld portions as in a conventional rotary electric machine, and an adhesive is not adhered to a tool by which the bus bars are pressed and inserted to the bus-bar storage grooves, and it can be prevented that the adhesive resin is adhered to the other work and a weld failure or the like is caused when the coil lead terminals are connected to the bus-bar lead terminals by a weld process or the like. Moreover, when the adhesive resin is coated after the bus bars are inserted as in a conventional rotary electric machine, the adhesive resin is not easily filled in a gap between the bus bars and the holder, and it is required that the nozzle is closed to the bus bars and the adhesive resin is slowly coated in order to stabilize a fixing force, and moreover, it is required that the adhesive resin is coated while the nozzle is avoided from an interference object, and a coating time is increased. However, in the manufacturing method according to Embodiment 1 of the present invention, all problems, which are described above, are resolved, and the rotary electric machine can be manufactured at a low cost.

Moreover, in the rotary electric machine according to Embodiment 1 of the present invention, in the plurality of partitions, lengths, in the axis direction, of the most outer circumference partition, which is positioned at the most outer circumference side in the diameter direction, and the most inner circumference partition, which is positioned at the most inner circumference side in the diameter direction, are longer than lengths, in the axis direction, of the plurality of middle partitions, which are positioned between the most outer circumference partition and the most inner circumference partition, and the lengths, in the axis direction, of the plurality of middle partitions are practically identical. Therefore, it is not required that the nozzle is inserted to each of the bus-bar storage grooves, so that the thick nozzle can be used, and a coating time can be reduced. Moreover, a coating amount of adhesive resin is not non-uniform at each of the bus-bar storage grooves. Moreover, it is not required that the nozzle is orbited around each of the partitions, and position accuracy of the nozzle can be reduced, and a cost of a tactic and a facility can be reduced.

Moreover, in the rotary electric machine according to Embodiment 1 of the present invention, the bus-bar lead terminals includes the first extended portions which are configured in such a way that those are led from the bus bars to the axis direction of the stator, and a thickness direction is practically identical to a diameter direction of the stator, and a width direction is practically identical to a circumference direction of the stator; the second extended portions which are bent from end portions of the first extended portions in the axis direction of the stator to an edgewise direction of the first extended portions, and are extended in the circumference direction of the stator; and the second step is composed of a step in which the end portions of the second extended portions in the axis direction are practically pressed in the axis direction, and a plurality of bus bars are inserted to a plurality of bus-bar storage grooves on which the adhesive resin is coated. Therefore, when the bus bars are directly bent from a rise direction to a circumference direction, it is not feared that the bus bars are pressed in the same direction of the bent direction of the bus bars, and a strength of a pressure surface is insufficient, and the bus bars are not completely pressed, so that the bus bars are certainly inserted to the bus-bar storage grooves of the holder 91 by a strong pressure. Moreover, the bus-bar lead terminals are configured in such a way that the bus-bar lead terminals are protruded from the bus bars to the axis direction of the stator, so that even when the adhesive resin is filled in the bus-bar storage grooves, the bus bars can be easily pressed and inserted to the bus-bar storage grooves.

Embodiment 2

Figure 8:
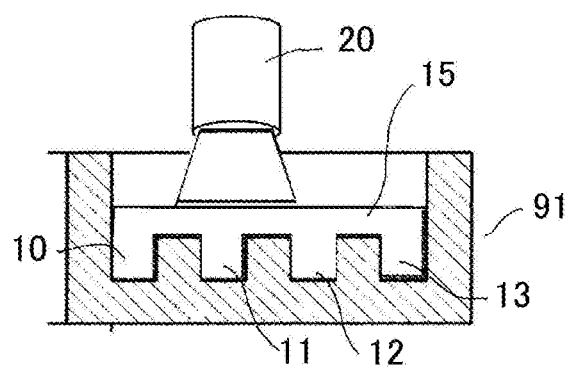
FIG. 8 is an explanatory view illustrating a manufacturing method of a rotary electric machine according to Embodiment 2 of the present invention.
Figure 9:
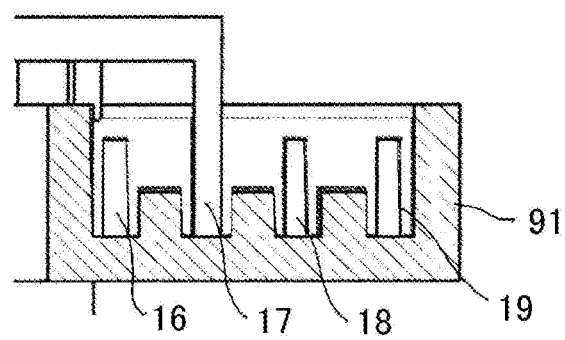
FIG. 9 is an explanatory view illustrating a manufacturing method of the rotary electric machine according to Embodiment 2 of the present invention.

Hereinafter, a rotary electric machine and a manufacturing method of the rotary electric machine according to Embodiment 2 of the present invention will be explained. FIG. 8 is an explanatory view illustrating the manufacturing method of the rotary electric machine according to Embodiment 2 of the present invention, and FIG. 8 illustrates a first step in which an adhesive resin 15 is coated on bus-bar storage grooves of a holder. FIG. 9 is an explanatory view illustrating a manufacturing method of the rotary electric machine according to Embodiment 2 of the present invention, and FIG. 9 illustrates a state in which bus bars are inserted to the bus-bar storage grooves of the holder in accordance with the first step.

In the rotary electric machine according to Embodiment 2, lengths, in an axis direction, of the most outer circumference partition 98, which is positioned at the most outer circumference side in a diameter direction, and the most inner circumference partition 94, which is positioned at the most inner circumference side in the diameter direction, are longer than lengths, in an axis direction, of the first middle partition 95, the second middle partition 96, and the third middle partition 97, which are a plurality of middle partitions positioned between the most outer circumference partition 98 and the most inner circumference partition 94, and moreover, the lengths, in the axis direction, of the first middle partition 95, the second middle partition 96, and the third middle partition 97 are practically identical, and the lengths, in the axis direction, of the first middle partition 95, the second middle partition 96, and the third middle partition 97 are shorter than the lengths of those in a case of Embodiment 1, and the adhesive resin 15 is concurrently coated on a first bus-bar storage groove 10, a second bus-bar storage groove 11, a third bus-bar storage groove 12, and a fourth bus-bar storage groove 13 by a thick nozzle 20 as illustrated in FIG. 8. In this case, end portions in an axis direction of the first middle partition 95, the second middle partition 96, and the third middle partition 97 are buried in the adhesive resin 15.

After that, as in the second step, end portions, in an axis direction, of bus-bar lead terminals 6 are practically pressed in the axis direction, and a first bus bar 16, a second bus bar 17, a third bus bar 18, and a fourth bus bar 19 are inserted to the first bus-bar storage groove 10, the second bus-bar storage groove 11, the third bus-bar storage groove 12, and the fourth bus-bar storage groove 13, on which the adhesive resin 15 is coated.

The other configurations of the rotary electric machine and the other steps in the manufacturing method of the rotary electric machine are similar to those in the above-described Embodiment 1.

In the rotary electric machine according to Embodiment 2 of the present invention, an effect, which is similar to the effect in the above-described Embodiment 1, can be realized, and in particular, the lengths, in the axis direction, of the plurality of middle partitions are practically identical, and the lengths of the middle partitions are short in such a way that the end portions, in the axis direction, of the middle partitions are buried by the coated adhesive resin 15. Therefore, it is not required that the nozzle is inserted to each of the bus-bar storage grooves, so that the thick nozzle can be used, and a coating time can be reduced. Moreover, a coating amount of the adhesive resin 15 is not non-uniform at each of the bus-bar storage grooves. Moreover, it is not required that the nozzle is orbited around each of the partitions, and position accuracy of the nozzle can be reduced, and a cost of a tactic and a facility can be reduced.

Embodiment 3

Figure 10:
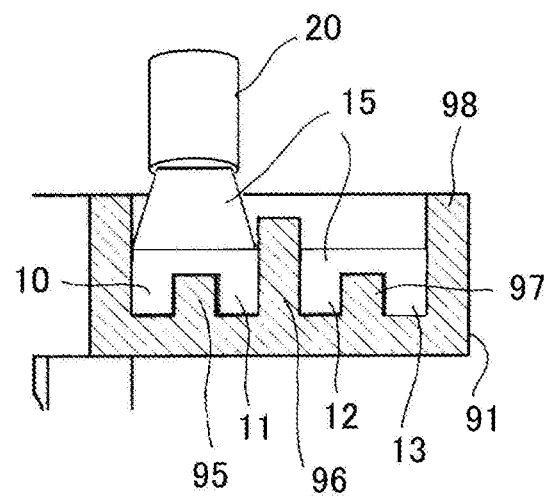
FIG. 10 is an explanatory view illustrating a manufacturing method of a rotary electric machine according to Embodiment 3 of the present invention.
Figure 11:
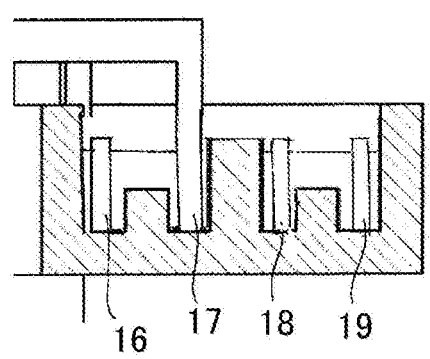
FIG. 11 is an explanatory view illustrating a manufacturing method of the rotary electric machine according to Embodiment 3 of the present invention.

Hereinafter, a rotary electric machine and a manufacturing method of the rotary electric machine according to Embodiment 3 of the present invention will be explained. FIG. 10 is an explanatory view illustrating the manufacturing method of the rotary electric machine according to Embodiment 3 of the present invention, and FIG. 10 illustrates a first step in which an adhesive resin 15 is coated on bus-bar storage grooves of a holder. FIG. 11 is an explanatory view illustrating a manufacturing method of the rotary electric machine according to Embodiment 3 of the present invention, and FIG. 11 illustrates a state in which bus bars are inserted to the bus-bar storage grooves of the holder in accordance with the first step.

In the rotary electric machine according to Embodiment 3, in a plurality of partitions, lengths, in an axis direction, of the most outer circumference partition, which is positioned at the most outer circumference side in a diameter direction, and the most inner circumference partition, which is positioned at the most inner circumference side in the diameter direction, are longer than lengths, in an axis direction, of a plurality of middle partitions which are positioned between the most outer circumference partition and the most inner circumference partition, and the length, in the axis direction, of the middle partition, which is practically positioned at a central position in a diameter direction in the plurality of middle partitions, is longer than the lengths, in the axis direction, of the other middle partitions. Moreover, the first step is composed of a step in which the adhesive resin 15 is previously coated on a plurality of bus-bar storage grooves in such a way that the middle partition, of which length is longer than the lengths of the other middle partitions, is used as a guide, before a plurality of bus bars are installed to a plurality of bus-bar storage grooves, and the end portions, in the axis direction, of the other middle partitions are buried by the adhesive resin 15.

In other words, in a plurality of partitions of a holder 91 in FIG. 10, lengths, in an axis direction, of the most outer circumference partition 98, which is positioned at the most outer circumference side in a diameter direction, and the most inner circumference partition 94, which is positioned at the most inner circumference side in the diameter direction, are longer than lengths, in an axis direction, of a first middle partition 95, a second middle partition 96, and a third middle partition 97, which are positioned between the most outer circumference partition 98 and the most inner circumference partition 94, and moreover, the length, in the axis direction, of the second middle partition 96, which is practically positioned at a central position in a diameter direction in the first middle partition 95, the second middle partition 96, and the third middle partition 97, is longer than the lengths, in the axis direction, of the first middle partition 95 and the third middle partition 97.

In the first step in which the adhesive resin 15 is coated on a first bus-bar storage groove 10, a second bus-bar storage groove 11, a third bus-bar storage groove 12, and a fourth bus-bar storage groove 13 of the holder 91, the adhesive resin 15 is previously coated on the first bus-bar storage groove 10 and the second bus-bar storage groove 11 in such a way that the second middle partition 96, of which length in the axis direction is the longest, is used as a guide, before the first bus bar 16, the second bus bar 17, the third bus bar 18, and the fourth bus bar 19 are installed to the first bus-bar storage groove 10, the second bus-bar storage groove 11, the third bus-bar storage groove 12, and the fourth bus-bar storage groove 13. In this case, the second middle partition 96 is used as a shifting guide, by which a nozzle 20 is shifted along an annular shape of the holder 91. After that, the adhesive resin 15 is coated on the third bus-bar storage groove 12 and the fourth bus-bar storage groove 13 in such a way that the second middle partition 96, of which length in the axis direction is the longest, is used as a guide. In this case, the second middle partition 96 is used as the shifting guide, by which the nozzle 20 is shifted along the annular shape of the holder 91. In addition, it can be certainly performed that a procedure of a step, in which the adhesive resin 15 is coated on the first bus-bar storage groove 10 and second bus-bar storage groove 11, and a step, in which the adhesive resin 15 is coated on the third bus-bar storage groove 12 and the fourth bus-bar storage groove 13, is reverse to the above-described procedure.

In addition, the adhesive resin 15 may be coated on the first bus-bar storage groove 10 in such a way that the most inner circumference partition 94 is used as a guide, and the adhesive resin 15 may be coated on the fourth bus-bar storage groove 13 in such a way that the most outer circumference partition 98 is used as a guide, and the adhesive resin 15 may be coated on the second bus-bar storage groove 11 in such a way that the second middle partition 96 is used as a guide, and the adhesive resin 15 may be coated on the third bus-bar storage groove 12 in such a way that the second middle partition 96 is used as a guide.

After that, as in the second step as illustrated in FIG. 11, end portions, in an axis direction of bus-bar lead terminals 6 are practically pressed in the axis direction, and the first bus bar 16, the second bus bar 17, the third bus bar 18, and the fourth bus bar 19 are inserted to the first bus-bar storage groove 10, the second bus-bar storage groove 11, the third bus-bar storage groove 12, and the fourth bus-bar storage groove 13, on which the adhesive resin 15 is coated.

The other configurations of the rotary electric machine and the other steps in the manufacturing method of the rotary electric machine are similar to those in the above-described Embodiment 1.

In the rotary electric machine according to Embodiment 3 of the present invention, even when each of the middle partitions is buried in the adhesive resin 15, the length, in the axis direction, of the second middle partition 96 is long, so that the adhesive resin 15 can be effectively coated in such a way that the second middle partition 96 is used as a guide.

Embodiment 4

Figure 12:
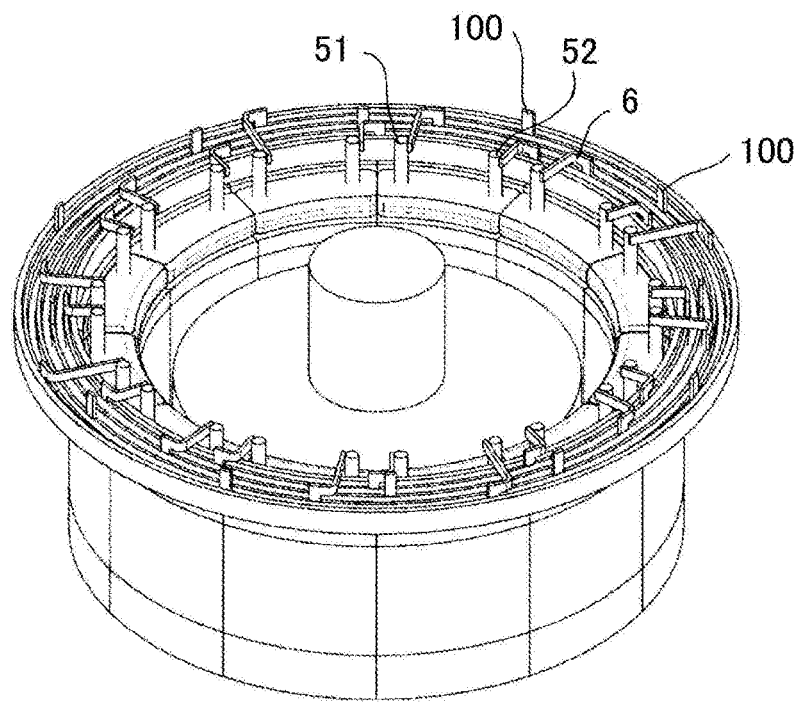
FIG. 12 is a schematic oblique perspective view illustrating a rotary electric machine according to Embodiment 4 of the present invention.
Figure 13:
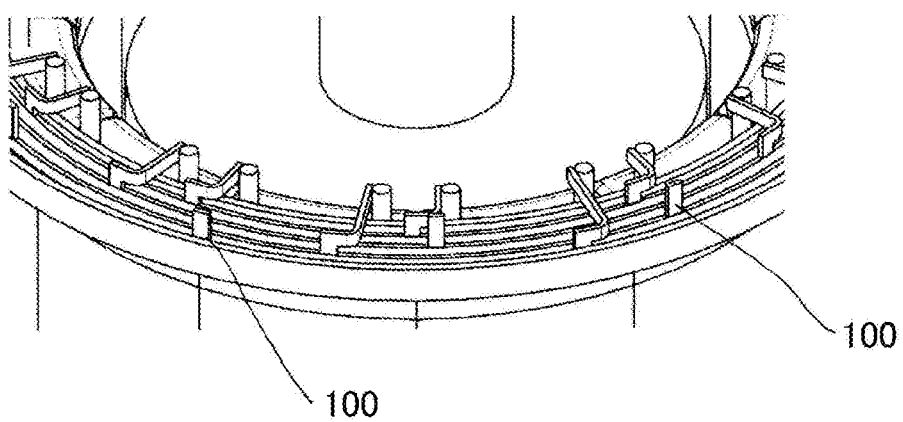
FIG. 13 is a schematic oblique perspective view enlarging and illustrating a main portion of the rotary electric machine according to Embodiment 4 of the present invention.

Hereinafter, a rotary electric machine and a manufacturing method of the rotary electric machine according to Embodiment 4 of the present invention will be explained. FIG. 12 is a schematic oblique perspective view illustrating the rotary electric machine according to Embodiment 4 of the present invention, and FIG. 13 is a schematic oblique perspective view enlarging and illustrating a main portion of the rotary electric machine according to Embodiment 4 of the present invention. As illustrated in FIG. 12 and FIG. 13, in the rotary electric machine according to Embodiment 4, a first bus bar 16, a second bus bar 17, a third bus bar 18, and a fourth bus bar 19 respectively include a plurality of protrusions 100, which are formed in such a way that the protrusions 100 are protruded in an axis direction of a stator 1, via a predetermined gap in a circumference direction. The other configurations of the rotary electric machine are similar to those in the above-described Embodiment 1.

In Embodiment 4, the manufacturing method of the rotary electric machine includes a second step in which end portions, in the axis direction, of the protrusions 100 of each of the bus bars are pressed in the axis direction of the stator 1, and each of the bus bars is inserted to each of the bus-bar storage grooves on which an adhesive resin 15 is coated. The other steps of the manufacturing method are similar to those in the above-described Embodiment 1 through Embodiment 3.

In the rotary electric machine according to Embodiment 4 of the present invention, the protrusions 100 are provided at the each of the bus bars, so that the each of the bus bars can be certainly inserted to the bus-bar storage grooves by pressing the protrusions 100. Moreover, when bus-bar lead terminals cannot be extended in a circumference direction in accordance with a relation of a resonance point or the like, the each of the bus bars can be certainly inserted to the bus-bar storage grooves. Moreover, it is not required that the bus-bar lead terminals are pressed, so that the bus-bar lead terminals are not deformed, and it is not feared the a weld failure is caused. Moreover, even when a gap in a circumference direction, in which a plurality of bus-bar lead terminals are provided, is wide, the protrusions 100 are suitably arranged without reference to the gap, whereby the each of the bus bars can be inserted to the bus-bar storage grooves.

In the present invention, in the scope in which a spirit of the present invention is not deviated, it is possible that each of embodiments is suitably combined, or each of embodiments is suitably modified.

What is claimed is:

1. A rotary electric machine comprising: a stator that includes stator coils for a plurality of phases at an inner circumference portion of a stator core that is formed in an annular shape; a rotor that is inserted to central space of the stator, and includes a plurality of magnetic poles at an outer circumference portion; and a connection component that is mounted at least at one end portion in an axis direction of the stator, and mutually connects the stator coils for the plurality of phases, and holds bus bars that feed an electric current to the stator coils for the plurality of phases; wherein the connection component includes a holder made of an insulating material that is formed in an annular shape, and is mounted at the stator in a state where one end portion in an axis direction of the connection component is faced to the one end portion in the axis direction of the stator, and includes a plurality of bus-bar storage grooves having an annular shape that are concentrically arranged at the other end portion in the axis direction of the connection component, a plurality of bus bars having an annular shape that are respectively installed in the plurality of bus-bar storage grooves, and are respectively corresponded to the plurality of phases, and an adhesive resin that is arranged in each of the bus-bar storage grooves, and fixes the plurality of bus bars to the holder; and the plurality of bus bars include bus-bar lead terminals that are respectively connected to coil lead terminals of the stator coils for the plurality of phases that are corresponded to the bus bars; and the bus-bar lead terminals are formed in such a way that the bus-bar lead terminals are protruded from the bus bars to the axis direction of the stator; and the plurality of bus-bar storage grooves are formed by using a plurality of partitions that are concentrically arranged in a diameter direction of the stator via gaps; and in the plurality of partitions, lengths, in the axis direction, of a most outer circumference partition that is positioned at a most outer circumference side in the diameter direction, and a most inner circumference partition that is positioned at a most inner circumference side in the diameter direction, are longer than lengths, in the axis direction, of a plurality of middle partitions that are positioned between the most outer circumference partition and the most inner circumference partition; wherein the bus-bar lead terminals include first extended portions that are configured in such a way that those are led from the bus bars to the axis direction of the stator, and a thickness direction is identical to a diameter direction of the stator, and a width direction is identical to a circumference direction of the stator; and second extended portions that are bent from end portions of the first extended portions in the axis direction of the stator to an edgewise direction of the first extended portions, and are extended in the circumference direction of the stator.

2. A rotary electric machine as recited in claim 1, wherein the bus bars include protrusions that are formed in such a way that the protrusions are protruded from the bus bars to the axis direction of the stator.

3. A rotary electric machine comprising: a stator that includes stator coils for a plurality of phases at an inner circumference portion of a stator core that is formed in an annular shape; a rotor that is inserted to central space of the stator, and includes a plurality of magnetic poles at an outer circumference portion; and a connection component that is mounted at least at one end portion in an axis direction of the stator, and mutually connects the stator coils for the plurality of phases, and holds bus bars that feed an electric current to the stator coils for the plurality of phases; wherein the connection component includes a holder made of an insulating material that is formed in an annular shape, and is mounted at the stator in a state where one end portion in an axis direction of the connection component is faced to the one end portion in the axis direction of the stator, and includes a plurality of bus-bar storage grooves having an annular shape that are concentrically arranged at the other end portion in the axis direction of the connection component, a plurality of bus bars having an annular shape that are respectively installed in the plurality of bus-bar storage grooves, and are respectively corresponded to the plurality of phases, and an adhesive resin that is arranged in each of the bus-bar storage grooves, and fixes the plurality of bus bars to the holder; and the plurality of bus bars include bus-bar lead terminals that are respectively connected to coil lead terminals of the stator coils for the plurality of phases that are corresponded to the bus bars; and the bus-bar lead terminals are formed in such a way that the bus-bar lead terminals are protruded from the bus bars to the axis direction of the stator; and the plurality of bus-bar storage grooves are formed by using a plurality of partitions that are concentrically arranged in a diameter direction of the stator via gaps; and in the plurality of partitions, lengths, in the axis direction, of a most outer circumference partition that is positioned at a most outer circumference side in the diameter direction, and a most inner circumference partition that is positioned at a most inner circumference side in the diameter direction, are longer than lengths, in the axis direction, of a plurality of middle partitions that are positioned between the most outer circumference partition and the most inner circumference partition; and the plurality of middle partitions are configured in such a way that a plurality of middle partitions, having lengths in the axis direction are different from each other, are mixed, wherein the bus-bar lead terminals include first extended portions that are configured in such a way that those are led from the bus bars to the axis direction of the stator, and a thickness direction is identical to a diameter direction of the stator, and a width direction is identical to a circumference direction of the stator; and second extended portions that are bent from end portions of the first extended portions in the axis direction of the stator to an edgewise direction of the first extended portions, and are extended in the circumference direction of the stator.

4. A rotary electric machine as recited in claim 3, wherein a middle partition that is positioned at a central position in the diameter direction, in the plurality of middle partitions, is formed in such a way that a length, in the axis direction, of the middle partition is longer than lengths, in the axis direction, of the other middle partitions.

5. A rotary electric, machine as recited in claim 3, wherein the bus bars include protrusions that are formed in such a way that the protrusions are protruded from the bus bars to the axis direction of the stator.

6. A manufacturing method of a rotary electric machine that includes a stator that includes stator coils for a plurality of phases at an inner circumference portion of a stator core that is formed in an annular shape; a rotor that is inserted to central space of the stator, and includes a plurality of magnetic poles at an outer circumference portion; and a connection component that is mounted at least at one end portion in an axis direction of the stator, and mutually connects the stator coils for the plurality of phases, and holds bus bars that feed an electric current to the stator coils for the plurality of phases; wherein the connection component includes a holder made of an insulating material, that is formed in an annular shape, and is mounted at the stator in a state where one end portion in an axis direction of the connection component is faced to the one end portion in the axis direction of the stator, and includes a plurality of bus-bar storage grooves having an annular shape that are concentrically arranged at the other end portion in the axis direction of the connection component, a plurality of bus bars having an annular shape that are respectively installed in the plurality of bus-bar storage grooves, and are respectively corresponded to the plurality of phases, and an adhesive resin that is arranged in each of the bus-bar storage grooves, and fixes the plurality of bus bars to the holder and the plurality of bus bars include bus-bar lead terminals that are respectively connected to coil lead terminals of the stator coils for the plurality of phases that are corresponded to the bus bars; and the bus-bar lead terminals are formed in such a way that the bus-bar lead terminals are protruded from the bus bars to the axis direction of the stator; wherein the manufacturing method includes a first step wherein the adhesive resin is previously coated on the plurality of bus-bar storage grooves before the plurality of bus bars are installed to the plurality of bus-bar storage grooves; a second step in wherein end portions in the axis direction of the bus-bar lead terminals are pressed in the axis direction, and the plurality of bus bars are inserted to the plurality of bus-bar storage grooves on that the adhesive resin is coated; a third step wherein the holder is mounted at the stator in such a way that one end portion in the axis direction of the holder is faced to one end portion in the axis direction of the stator; and a fourth step wherein the bus-bar lead terminals are connected to the coil lead terminals, wherein the bus-bar lead terminals include first extended portions that are configured in such a way that those are led from the bus bars to the axis direction of the stator, and a thickness direction is identical to a diameter direction of the stator, and a width direction is identical to a circumference direction of the stator; and second extended portions that are bent from end portions of the first extended portions in the axis direction of the stator to an edgewise direction of the first extended portions, and are extended in the circumference direction of the stator; and the second step is composed of a step wherein end portions of the second extended portions in the axis direction are pressed in the axis direction, and the plurality of bus bars are inserted to the plurality of bus-bar storage grooves on that the adhesive resin is coated.

7. A manufacturing method of a rotary electric machine as recited in claim 6, wherein the plurality of bus-bar storage grooves are formed by using a plurality of partitions that are concentrically arranged in a diameter direction of the stator via gaps; and in the plurality of partitions, lengths, in the axis direction, of a most outer circumference partition that is positioned at a most outer circumference side in the diameter, and a most inner circumference partition that is positioned at a most inner circumference side in the diameter direction, are longer than lengths, in the axis direction, of a plurality of middle partitions that are positioned between the most outer circumference partition and the most inner circumference partition; and the first step is composed of a step wherein the adhesive resin is previously coated on the plurality of bus-bar storage grooves before the plurality of bus bars are installed to the plurality of bus-bar storage grooves.

8. A manufacturing method of a rotary electric machine as recited in claim 6, wherein the plurality of bus-bar storage grooves are formed by using a plurality of partitions that are concentrically arranged in a diameter direction of the stator via gaps; and in the plurality of partitions, lengths, in the axis direction, of a most outer circumference partition that is positioned at a most outer circumference side in the diameter direction, and a most inner circumference partition that is positioned at a most inner circumference side in the diameter direction, are longer than lengths, in the axis direction, of a plurality of middle partitions that are positioned between the most outer circumference partition and the most inner circumference partition; and a middle partition that is positioned at a central position in the diameter direction, in the plurality of middle partitions, is formed in such a way that a length, in the axis direction, of the middle partition is longer than lengths, in the axis direction, of the other middle partitions; and a first step is composed of a step wherein the adhesive resin is previously coated on the plurality of bus-bar storage grooves in such a way that the middle partition, having length in the axis direction is longer than the lengths, in the axis direction, of the other middle partitions, is used as a guide, before the plurality of bus bars are installed to the plurality of bus-bar storage grooves.

9. A manufacturing method of a rotary electric machine that includes a stator that includes stator coils for a plurality of phases at an inner circumference portion of a stator core that is formed in an annular shape; a rotor that is inserted to central space of the stator, and includes a plurality of magnetic poles at an outer circumference portion; and a connection component that is mounted at least at one end portion in an axis direction of the stator, and mutually connects the stator coils for the plurality of phases, and holds bus bars that feed an electric current to the stator coils for the plurality of phases; wherein the connection component includes a holder made of an insulating material that is formed in an annular shape, and is mounted at the stator in a state where one end portion in an axis direction of the connection component is faced to the one end portion in the axis direction the stator, and includes a plurality of bus-bar storage grooves having an annular shape that are concentrically arranged at the other end portion in the axis direction of the connection component, a plurality of bus bars having an annular shape that are respectively installed in the plurality of bus-bar storage grooves, and are respectively corresponded to the plurality of phases, and an adhesive resin that is arranged in each of the bus-bar storage grooves, and fixes the plurality of bus bars to the holder; and the plurality of bus bars include bus-bar lead terminals that are respectively connected to coil lead terminals of the stator coils for the plurality of phases that are corresponded to the bus bars, and protrusions that are formed in such a way that the protrusions are protruded from the bus bars to the axis direction of the stator; wherein the manufacturing method includes a first step wherein the adhesive resin is previously coated on the plurality of bus-bar storage grooves before the plurality of bus bars are installed to the plurality of bus-bar storage grooves; a second step wherein end portions in the axis direction of the protrusions of the bus bars are pressed in the axis direction, and the plurality of bus bars are inserted to the plurality of bus-bar storage grooves on that the adhesive resin is coated; a third step wherein the holder is mounted at the stator in such a way that one end portion in the axis direction of the holder is faced to one end portion in the axis direction of the stator; and a fourth step wherein the bus-bar lead terminals are connected to the coil lead terminals, wherein the bus-bar lead terminals include first extended portions that are configured in such a way that those are led from the bus bars to the axis direction of the stator, and a thickness direction is identical to a diameter direction of the stator, and a width direction is identical to a circumference direction of the stator; and second extended portions that are bent from end portions of the first extended portions in the axis direction of the stator to an edgewise direction of the first extended portions, and are extended in the circumference direction of the stator; and the second step is composed of a step wherein end portions of the second extended portions in the axis direction are pressed in the axis direction, and the plurality of bus bars are inserted to the plurality of bus-bar storage grooves on that the adhesive resin is coated.

10. A manufacturing method of a rotary electric machine as recited in claim 9, wherein the plurality of bus-bar storage grooves are formed by using a plurality of partitions that are concentrically arranged in a diameter direction of the stator via gaps; and in the plurality of partitions, lengths, in the axis direction, of a most outer circumference partition that is positioned at a most outer circumference side in the diameter, and a most inner circumference partition that is positioned at a -most inner circumference side in the diameter direction, are longer than lengths, in the axis direction, of a plurality of middle partitions that are positioned between the most outer circumference partition and the most inner circumference partition; and the first step is composed of a step wherein the adhesive resin is previously coated on the plurality of bus-bar storage grooves before the plurality of bus bars are installed to the plurality of bus-bar storage grooves.

11. A manufacturing method of a rotary electric machine as recited in claim 9, wherein the plurality of bus-bar storage grooves are formed by using a plurality of partitions that are concentrically arranged in a diameter direction of the stator via gaps; and in the plurality of partitions, lengths, in the axis direction, of a most outer circumference partition that is positioned at a most outer circumference side in the diameter direction, and a most inner circumference partition that is positioned at a most inner circumference side in the diameter direction, are longer than lengths, in the axis direction, of a plurality of middle partitions that are positioned between the most outer circumference partition and the most inner circumference partition; and a middle partition that is positioned at a central position in the diameter direction, in the plurality of middle partitions, is formed in such a way that a length, in the axis direction, of the middle partition is longer than lengths, in the axis direction, of the other middle partitions; and a first step is composed of a step wherein the adhesive resin is previously coated on the plurality of bus-bar storage grooves in such a way that the middle partition, having length in the axis direction is longer than the lengths, in the axis direction, of the other middle partitions, is used as a guide, before the plurality of bus bars are installed to the plurality of bus-bar storage grooves.

12. A rotary electric machine as recited in claim 1, wherein the lengths, in the axis direction, of the plurality of middle partitions are identical.

\* \* \* \* \*